(12) United States Patent
Takematsu (10) Patent No.: US 6,704,500 B2
(45) Date of Patent: Mar. 9, 2004

(54) CONTROL OF LIGHT EMISSION FROM FLASH LAMP EXTERNALLY ATTACHED TO DIGITAL CAMERA

(75) Inventor: Yoshiyuki Takematsu, Tokyo (JP)

(73) Assignee: INON, Inc., Kanagawa (JP)

( * ) Notice: Subject to any disclaimer, the term of this patent is extended or adjusted under 35 U.S.C. 154(b) by 32 days.

(21) Appl. No.: 10/260,581

(22) Filed: Sep. 27, 2002

(65) Prior Publication Data
US 2003/0086704 A1 May 8, 2003

(30) Foreign Application Priority Data

Nov. 5, 2001 (JP) ........................................ 2001-374952
Jan. 9, 2002 (JP) ........................................ 2002-036033

(51) Int. Cl.$^7$ ................................................ G03B 5/15
(52) U.S. Cl. .......................... 396/28; 396/171; 396/267
(58) Field of Search .......................... 396/28, 176, 267, 396/171, 182, 180, 189; 348/81

(56) References Cited

U.S. PATENT DOCUMENTS 4,252,426 A * 2/1981 Kuraishi ...................... 396/28
4,492,451 A * 1/1985 Maassen et al. ........ 396/267 X

* cited by examiner

*Primary Examiner*—W. B. Perkey
(74) *Attorney, Agent, or Firm*—Beyer Weaver & Thomas LLP (57) ABSTRACT

For controlling emission of light from an outer flash lamp having a light receiving part and externally attached to a camera, which may be a digital camera and may be enclosed inside a watertight housing for underwater photography, having an inner lamp which is provided internally and includes a light emitting part, a filter which passes infrared and near infrared light but prevents visible light from passing through may be attached to the light emitting part of the inner lamp or on the housing of the camera. Light emitted from the inner lamp has sufficiently strong infrared intensity and the portion passing through the filter is sufficiently strong to activate the outer lamp. The filter may be substituted with a light intensity-reducing filter for reducing the intensity of incident light thereon with an amplifier added to the light receiving part of the outer lamp such that the light with reduced intensity through such a filter can activate the outer lamp. A light guide may be used to deflect the forwardly propagating light emitted from the inner lamp and to lead it to the light receiving part of the outer lamp for activating it with a light screening plate provided to screen off the forwardly propagating light from the camera.

20 Claims, 5 Drawing Sheets

CONTROL OF LIGHT EMISSION FROM FLASH LAMP EXTERNALLY ATTACHED TO DIGITAL CAMERA

BACKGROUND OF THE INVENTION

This invention is in the technical field of controlling the light emission from a flash lamp internally contained in or externally attached to a digital cameral adapted for use in underwater photography.

When a camera (such as a digital camera) is used for underwater photography, it is usually enclosed inside a commercially available transparent colorless watertight housing. A transparent colorless container is used because the flash light emitted from a stroboscopic lamp internally provided to the camera will have to pass through the material of the housing to reach the target object to be illuminated. A stroboscopic lamp ("flash lamp") is more frequently used by an underwater photographer because the underwater environment is generally darker than above the water. If an internally provided flash lamp ("inner lamp") is used, however, the emitted flash light is reflected by dust particles and microorganisms floating in water because the light emitting element of the inner lamp is positioned close to the lens of the camera 1, producing white spots in the image and thereby giving rise to the so-called marine snow phenomenon. If the existing particles are very fine, the picture as a whole may become whiter, adversely affecting the contrast of the picture.

An externally attached flash lamp ("outer lamp") is used in view of these problems. Since the light emitting element of the outer lamp can be farther removed from the lens of the camera, reflected light from particles near the lens can be reduced and the effect of the marine snow phenomenon becomes less severe, allowing it to be possible to obtain clearer pictures.

The explanations given above are generally on the assumption that the target objects are at distances in the range of 0.5 m–1.5 m.

Figure 1:
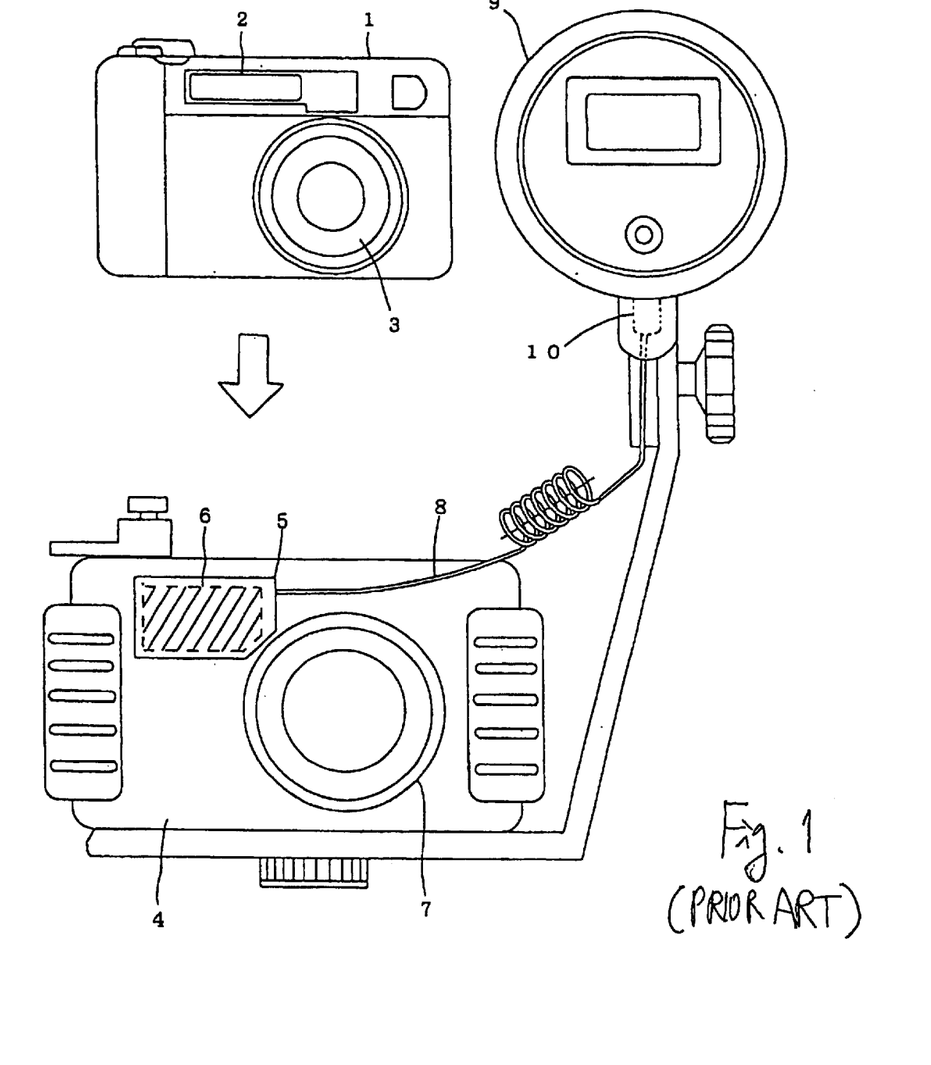
FIG. 1 is a front view of a camera with a prior art control device.

FIG. 1 shows a prior art method of control of a digital camera 1 provided with a stroboscopic light emitting element (or the inner lamp) 2 and a lens 3 and enclosed inside a watertight housing 4 to which an outer lamp 9 is attached. Numeral 7 indicates its outer frame. The outer lamp 9 must be synchronized with the so-called X-contact of the camera 1 (which is a switch on the part of the camera 1 adapted to close when the shutter of the camera 1 is opened) but commercially available camera housings are not equipped with any synchronization terminal to be connected to an outer lamp because it is troublesome to waterproof the portion of the housing at such a terminal and also because some cameras are not provided with an X-contact terminal.

A simple method of synchronizing the light emission from the outer lamp 9 without a synchronization terminal is to provide the outer lamp 9 with a sensor 10 for detecting the light emitted from the inner lamp 2 such that the emission of light from the outer lamp 9 will be synchronized. Numeral 8 indicates an optical fiber. The emission of light from the outer lamp 9 can be synchronized even without the optical fiber 8 as long as the light from the inner lamp 2 can reach the sensor 10. If the distance between the light emitting part of the inner lamp 2 and the outer lamp 9 is large, however, the optical fiber 8 serves to dependably transmit to the sensor 10 the light from the inner lamp 2.

In order to reduce the effect of the aforementioned marine snow phenomenon, a black light-screening plate 6, or a plate with a black tape pasted thereon, is provided in front of a diffusing plate 5 such that the light from the inner lamp 2 will not reach the target object for the reason given above. According to the example shown in FIG. 1, the light emitted from the inner lamp 2 is passed through the optical fiber 8 to be detected by the outer lamp 9. This method is disadvantageous, however, in that the optical fiber must be provided and it is costly to have it installed.

The user of a camera as shown in FIG. 1 will discover that a significant amount of light emitted from the inner lamp 2 is leaking through the portions around the light-screening plate. Even if the light-screening plate is made wider, light continues to leak around the light-screening plate because the watertight housing is transparent and colorless. It is also because the walls of the light-emitting part of the camera and the watertight housing are separated. This gives rise to the aforementioned marine snow phenomenon because this leaked light passes very close to the lens of the camera. The marine snow phenomenon occurs also if there are many light-reflecting particles, whether the distance to the target object to be photographed is large or small. The light-screening plate is not very effective, although it is better than not using it at all.

Another problem of the prior art technology is the so-called flare phenomenon with a part of the light from the inner lamp reaching the lens of the camera by being reflected inside the housing or diffused near by because the housing is colorless and transparent. As a result, the user may fail to obtain a picture with a good contrast.

In the case of a digital camera for underwater photography, the camera itself is made watertight such that a housing as shown in FIG. 1 is not required. Since the inner lamp must be caused to emit light, however, there remains the same problem of the marine snow phenomenon unless the inner lamp and the outer lamp are connected by a synchronization cable for synchronizing their operations.

SUMMARY OF THE INVENTION

It is therefore a general object of this invention, in view of the status of the prior art technology described above, to provide a device for and method of controlling the emission of light from a flash lamp externally attached to a digital camera ("the outer lamp") for preventing as much as possible the occurrence of marine snow and flare phenomena caused by the light from an internally provided lamp ("the inner lamp") of the camera such that pictures of a higher quality than was possible before can be obtained.

It is a more specific object of this invention to provide such a device and a method characterized as using infrared light (inclusive of near-infrared light) to which the image-taking element of the camera is insensitive.

It is another more specific object of this invention to provide such a device and a method characterized as reducing the quantity of light coming from the light emitting part of the internally provided lamp of the camera or its vicinity so as not to be photographed, or as using a light guide to lead the flash light away so as not to be incident on the target objects to be photographed.

In view of the objects of the invention as described above, one of the methods of the invention may be described as comprising the steps of preparing a filter which passes infrared light but prevents visible light from passing through, providing the light emitting part of the inner lamp of a camera (such as a digital camera for underwater and/or above-water photography) with this filter, causing infrared light emitted through this filter to be received by the light receiving part of the outer flash lamp and thereby causing the light receiving part to control emission of light from the outer flash lamp. The filter may be pasted on the front surface of the light emitting part of the inner lamp or on the inner or outer surface of a watertight housing in which the camera may be enclosed when it is used for underwater photography. A control device to be used correspondingly may thus be characterized as comprising such a filter which passes infrared light but prevents visible light from passing through, being provided to the light emitting part of the inner lamp and a light receiving element which is in the light receiving part of the light receiving part and serves to control emission of light from the outer lamp in response to infrared light received through the filter.

In summary, this aspect of the invention is characterized as using the infrared (inclusive of near infrared) portion of the flash light from the inner lamp to generate a signal for activating the outer flash lamp. The outer lamp usually comprises a xenon discharge tube but xenon discharge tubes are well known for emitting infrared light equally strongly as or more strongly than visible light. According to this aspect of the invention, the visible portion of the emitted light from the inner light is filtered off and the abundantly present infrared portion is used to activate the outer flash lamp. For this purpose, the light receiving part of the outer lamp must include an element which has sensitivity to infrared light, or the capability of generating an electrical signal for activating the outer lamp in response to the infrared light received through the filter. Since silicon phototransistors and silicon photodiodes of known kinds have sufficient sensitivity to infrared light, they may directly be used for the purpose of this invention.

In another aspect of the invention, use is made of a light intensity-reducing filter, instead of a filter for preventing visible light from passing through while allowing infrared (and near infrared) light to pass through, either pasted on the light emitting part of the camera or, if the camera is for underwater photography and is enclosed inside a watertight housing, on the inner or outer surface of such a housing. In this case, a circuit such as an amplifier circuit may be provided in the light receiving part for amplifying the optical signal with reduced intensity received through such a light intensity-reducing filter such that a sufficiently strong electrical signal can be obtained therefrom for activating the outer lamp.

In still another aspect of the invention, use is made of a light guide serving to reflect (and deflect) the light emitted from the light emitting part of the inner lamp and to lead the deflected light therethrough to the light receiving part of the outer lamp while a light-screening means is provided to screen off light propagating forward from the camera. Such a light guide may be pasted onto the light emitting part of the inner lamp. If the camera is for underwater photography and is enclosed inside a housing, the light guide may be pasted on the inner or outer surface of the housing.

BRIEF DESCRIPTION OF THE DRAWINGS

Throughout herein similar or like components are indicated by the same symbols even where they are components of different systems and may not necessarily be explained repetitiously.

DETAILED DESCRIPTION OF THE INVENTION

Figure 2:
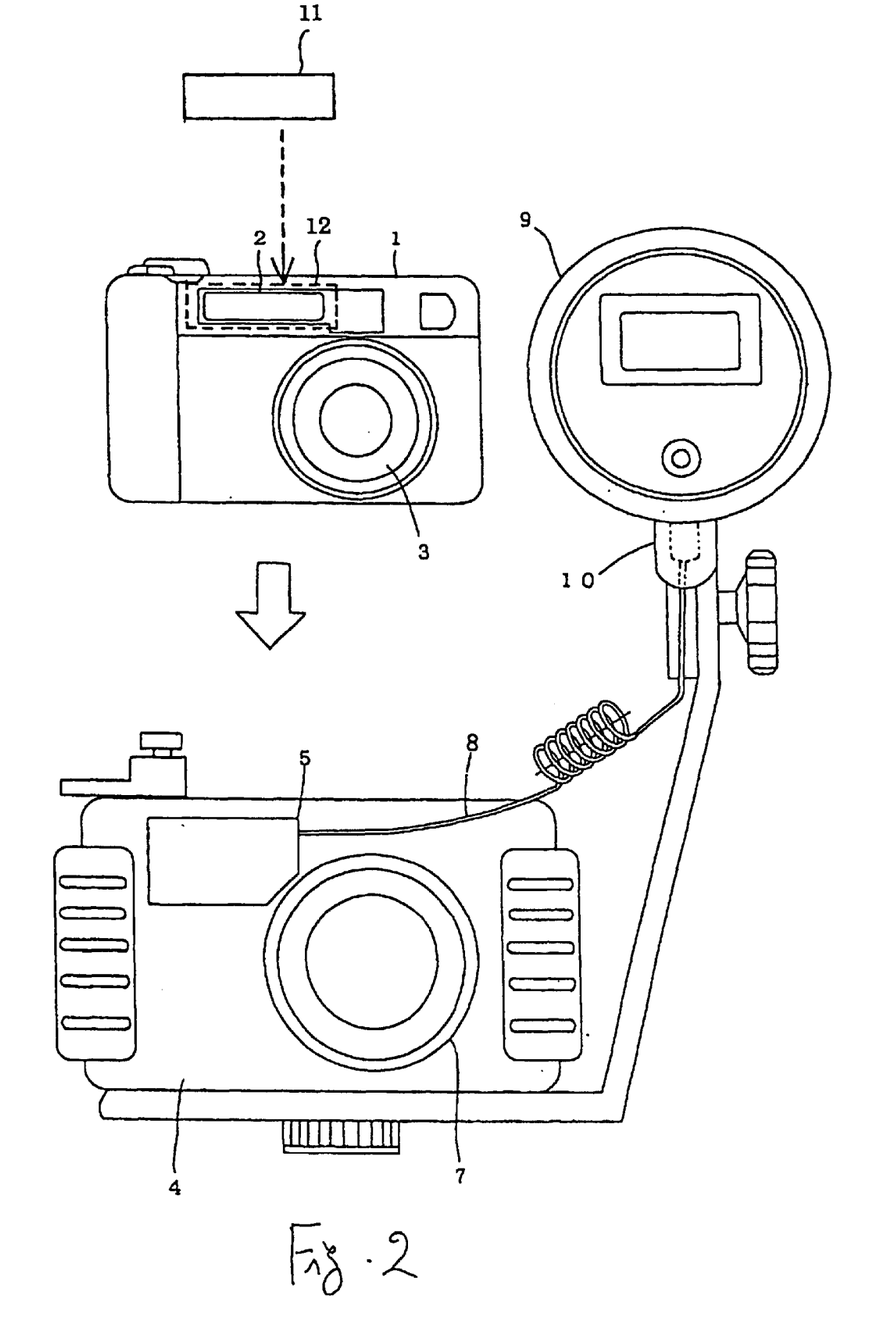
FIG. 2 is a front view of a camera with a control device embodying this invention.

The invention is described next by way of examples. FIG. 2 shows a control device according to a first embodiment of the invention characterized as having a filter 11 pasted over the light emitting part 2 of the camera as shown by numeral 12 before the camera is inserted into its housing. The filter 11 is for allowing infrared (and near infrared) light to pass through while preventing visible light from passing through. With such a filter 11 placed over the light emitting part 2 of the camera, visible light emitted from the camera when its internally provided lamp is switched on does not leak to the environment, causing no marine snow or flare phenomenon. In the meantime, infrared light is transmitted through the filter and the sensor 10 in the light receiving part is activated by this transmitted infrared light to cause the externally attached flash lamp ("outer lamp") 9 to emit light. The black light screening plate as shown at 6 in FIG. 1 is no longer required, and since the infrared light is emitted with a sufficient intensity, the optical fiber cable 8 may be dispensed with so as to simplify the structure. If it is desirable to make certain that the outer lamp 9 will function such as when the outer lamp 9 is relatively far away, it is preferable to make use of the optical fiber cable 8.

The filter 11 need not necessarily be pasted at the position indicated by numeral 12 in FIG. 2. It may be pasted inside or outside the housing (although not separately illustrated), or at any other place where it can be as effective. Even if it is pasted outside the housing, infrared light can be emitted with a sufficiently strong intensity such that the outer lamp can be activated dependably even without the use of the optical fiber cable 8. The filter may be made to cover a relatively large area since it does not affect the transmission of the infrared light. Thus, the leakage of light from areas around the light emitting part can be significantly reduced compared to the prior art technology.

In the case of a digital camera for both underwater and above-water photography, such a filter may be pasted on the front surface of its inner lamp for a similar effect.

Figure 3:
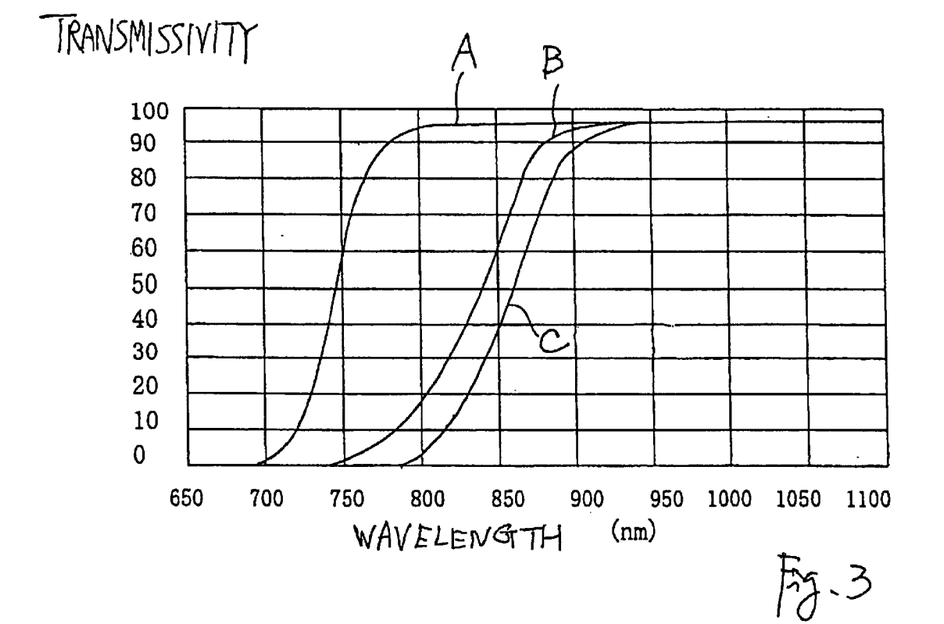
FIG. 3 is a graph of transmissivity characteristics of filters usable for this invention.

FIG. 3 shows the filtering characteristics of some commercially available examples of a filter which may be used for the purpose of this invention. In FIG. 3, letters A, B and C refer to examples commonly referred to as SC74, IR82 and IR84, respectively. The SC74 filter does not completely screen off visible light and allows near-infrared light to pass through but this may be usable, depending on the type of the camera and the environmental conditions such as brightness. The IR82 and IR84 filters are seen to nearly completely screen off light in the visible range of wavelength and hence may be used generally without any problem.

It goes without saying that there are many other kinds of filters which may be used, depending on their filtering characteristics. A plastic resin material with such a filtering characteristics may be molded into a suitable shape. If a sensor 10 with high infrared sensitivity is used, it is possible to use a filter with a filtering characteristic having a shielding threshold value moved in the direction of longer wavelengths.

The image-taking light receiving element of the camera may comprise a CCD or CMOS. Such devices produced in recent years are nearly totally insensitive to infrared light and no infrared image will be obtained. Since the pictures obtained will not have a good contrast if the light receiving element is sensitive to infrared light, a filter may be used over the light receiving element to reduce the camera's sensitivity to infrared. The present invention takes advantage of this characteristic of modern image-taking light receiving elements having poor (little) or no sensitivity to infrared light.

The only light passing through the filter (such as indicated above by letters A, B and C) is naturally infrared light which does not form any image on the camera (although the filter A allows a small amount of visible light to pass through). That the light from the inner lamp does not form any image on the camera means that marine snow and flare phenomena do not occur. The infrared light passing through the filter A, B or C is made incident on the sensor 10 of the outer lamp 9 through the optical fiber cable 8, directly or by being reflected from a target object to be photographed. Since the infrared light emitted from the inner lamp is sufficiently energetic, the optical fiber cable 8 is not essential. The outer lamp 9 can be activated either directly or by reflection, and this makes the method of operation and the device structure simpler.

Figure 4:
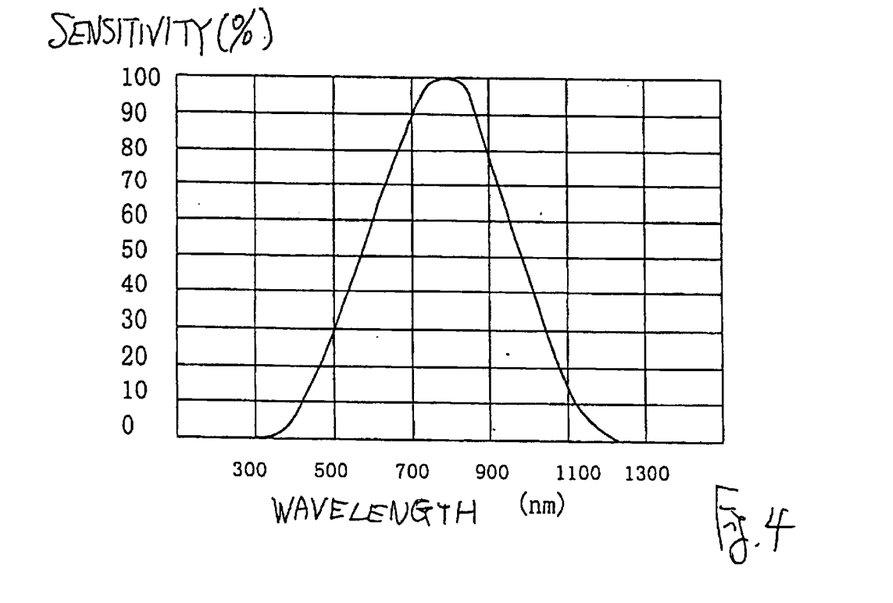
FIG. 4 is a graph of sensitivity characteristic of a sensor for the device embodying this invention.

The sensor 10 may comprise an element such as a phototransistor or a photodiode with a higher sensitivity to infrared light. FIG. 4 shows a representative characteristic of such a sensor, its vertical axis representing relative sensitivity and its horizontal axis indicating wavelength. In this example, the maximum sensitivity is at 800 nm, the sensitive wavelength regions extending widely on both sides thereof. Since the sensor 10 has such a high sensitivity in the infrared region, it can function dependably by receiving the infrared light through the aforementioned filter. As a matter of practical fact, the sensor 10 need not be particularly sensitive because the flash light from the discharge tube of the lamp is generally sufficiently strong. The sensor 10 serves to convert the received infrared light into an electrical signal with which the emission of light from the outer lamp 9 is controlled.

Figure 5:
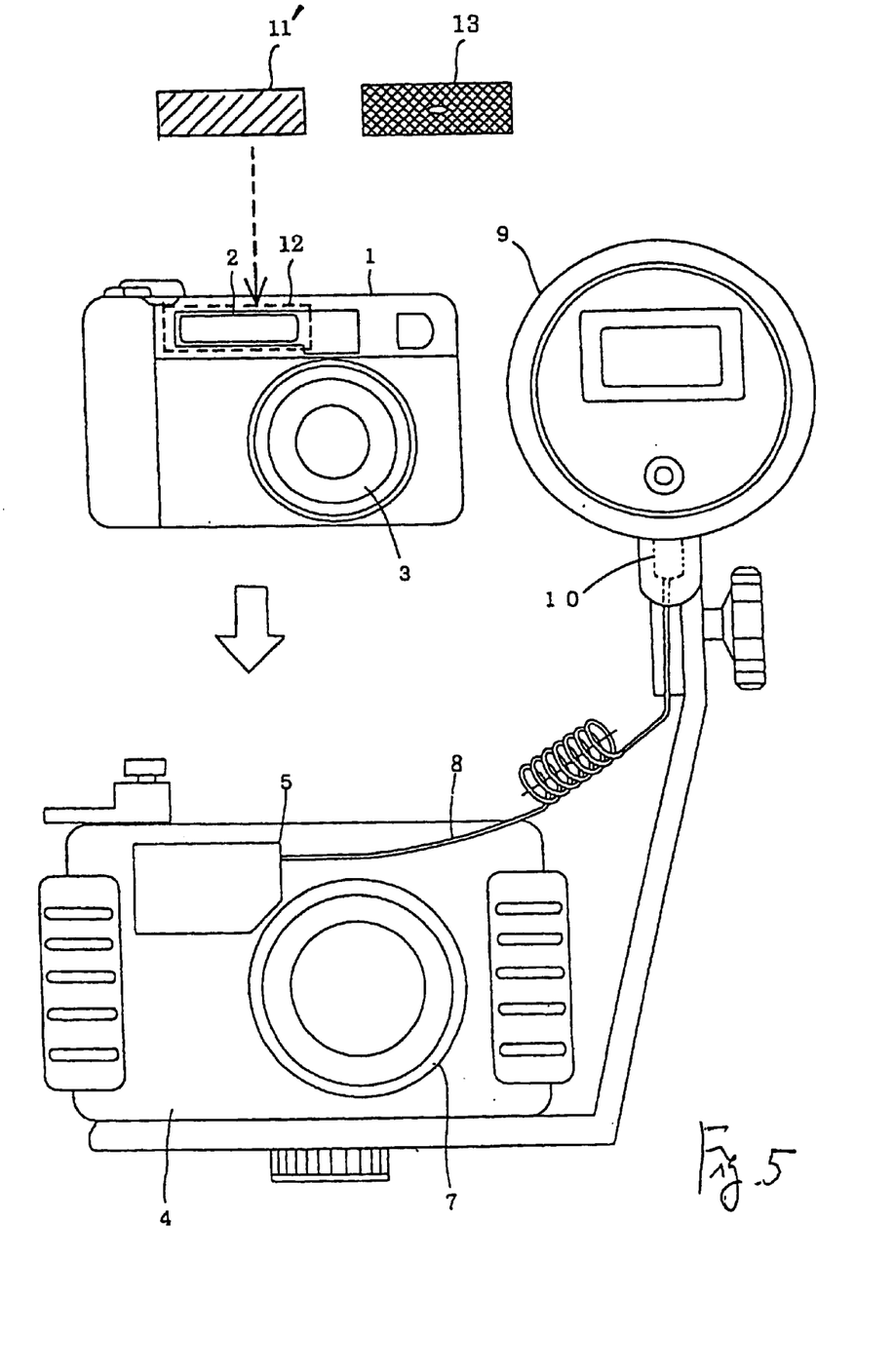
FIG. 5 is a front view of a camera with another control device embodying this invention.

FIG. 5 shows a control device according to a second embodiment of the invention characterized as having a light intensity-reducing filter 11' pasted over the light emitting part 2 of the camera as shown by numeral 12 before the camera is inserted into its housing. The light intensity-reducing filter 11' may be of any kind as long as it is capable of reducing the intensity of light as it passes therethrough. Examples of such a tape include ordinary ND (neutral density) filters, cloth tapes with fine holes, sheets of colored paper including white paper and vinyl tapes. Experiments have shown that leakage of light around the inner lamp can be stopped when it emits light and aforementioned marine snow and flare phenomena can be sufficiently reduced if the light quantity is reduced to $1/10$–$1/100$ of the original.

The quantity of light received by the sensor 10 is correspondingly reduced according to this embodiment of the invention. Thus, the signal from the sensor 10 must be amplified accordingly. If the quantity of light is reduced to $1/10$–$1/100$ of the original value, an amplifier circuit for amplification of 10 times to 100 times will be required for obtaining an equivalent signal. The original light quantity may be reduced to less than $1/100$ if an appropriate amplifier circuit is used.

Figure 6:
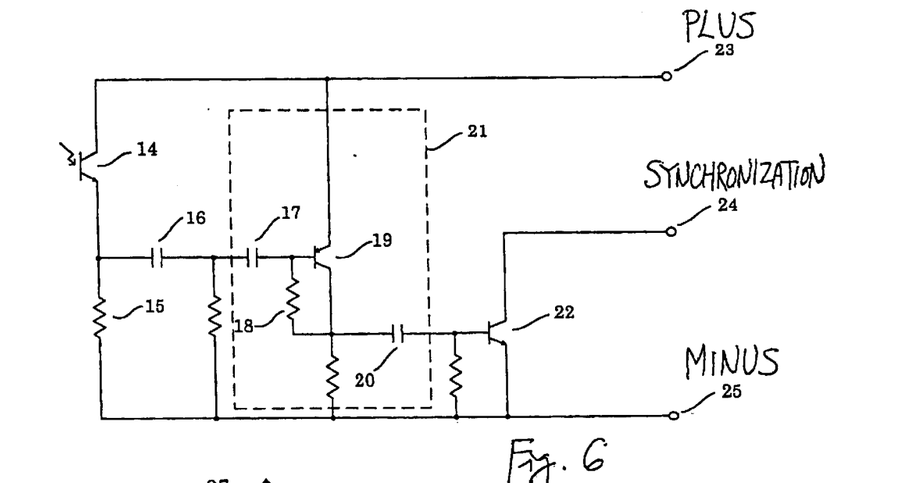
FIG. 6 is a circuit diagram of the sensor of the control device shown in FIG. 5.

FIG. 6 shows a circuit structure for the sensor 10. Numeral 21 in FIG. 6 indicates an amplifier circuit including a transistor 19. Prior art sensors did not include such an amplifier circuit, connecting a capacitor 16 for removing DC component directly to a transistor 22 because this was sufficient if the quantity of light from the inner lamp was sufficiently large. The amplifier circuit 21 shown in FIG. 6 is an AC amplifier circuit capable of amplification by a factor of 10 to about 400, depending on the selection of the components.

To explain the actual operation of the sensor 10 thus structured, the light from the inner lamp is received by a phototransistor 14 serving as a sensor and converted into an electrical signal. Numeral 15 indicates a load resistor connected to the AC amplifier circuit 21 through a capacitor 16 for eliminating the AC component. Input and output capacitors 17 and 18 are provided because it is an AC amplifier circuit respectively on the input and output sides. The transistor 19 has a bias voltage applied to its base through a bias resistor 18. Amplified signals are applied to a second transistor 22 of which the collector is connected to a synchronization terminal 24.

When the second transistor 22 is switched on by such an amplified signal, a trigger circuit (not shown) for the outer lamp is activated and controls the emission of flash light from the outer lamp 9. The black light-screening plate as shown at 6 in FIG. 1 may be dispensed with but it is preferable to use such a plate for the purpose of eliminating light propagating in forward directions. In FIG. 6, numerals 23 and 25 indicate terminals for connecting to a voltage source, a positive voltage and a negative voltage being respectively applied thereonto.

Although the invention has been described by way of only a limited number of examples, these examples are not intended to limit the scope of the invention. Many modifications and variations are possible within the scope of the invention. For example, the light intensity-reducing filter 11' need not be pasted at the position indicated in FIG. 5 as long as a comparable effect of reducing the light intensity can be obtained. It may be pasted inside the housing, for example, because this will prevent the diffusion of light through the transparent plastic housing. In such a case, a filter with a relatively large area should be pasted in order to prevent leakage of light. Instead of a light intensity-reducing filter as shown in at 11' in FIG. 2, a light-screening tape with a hole in the middle as shown at 13 in FIG. 5 may be pasted for obtaining an equivalent effect. It goes without saying that the light-screening tape 13 may be substituted with a light-screening plate structured similarly with a hole. With such a light-screening device, the light emitted through is naturally reduced from the total quantity of light from the inner lamp which would otherwise be propagated out. The quantity of light actually emitted out can be controlled by varying the size of the hole.

Figure 7:
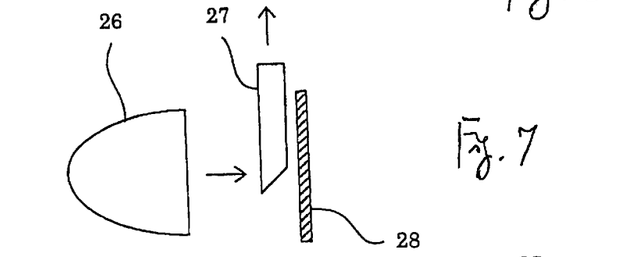
FIG. 7 is a side view of another control device embodying this invention including a light guide with various component shown separated from one another.
Figure 8:
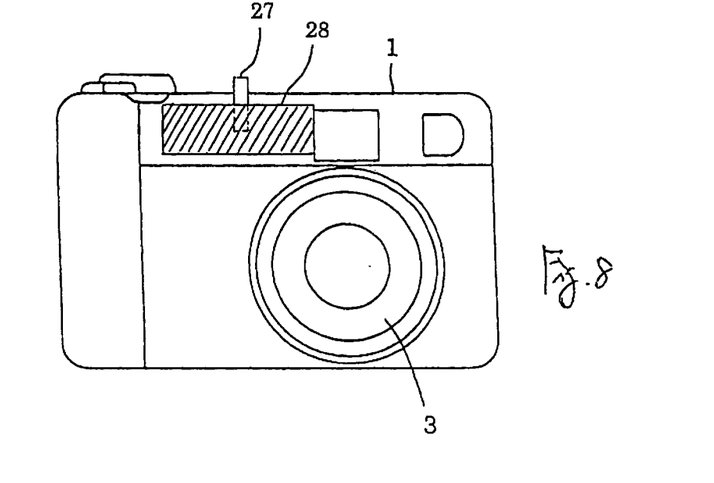
FIG. 8 is a front view of a camera provided with the control device of FIG. 7.

Another method is to make use of a light guide 27 which, as shown in FIGS. 7 and 8, may be a bar-like elongated structure with a rectangular cross-sectional shape with sides of 2–3 mm, made of a colorless transparent resin material such as acryl, and having a reflecting surface for changing the direction of incident light thereon. By increasing the reflecting surface, it is possible to bend the incident light into different directions.

With reference to FIG. 7, emitted light from a light emitting part 26 of the camera is propagated as indicated by the arrow and is bent upward through the light guide 27. The emitted light need not be deflected upward. It may be deflected in any other direction. Since the area is small through which the deflected light is guided, this light does not come to affect the photographed image.

An optical fiber may be used as a light guide. An optical fiber as a light guide is advantageous because of an increased degree of freedom of position.

A light-screening plate 28 is placed in front of the light guide 27 for screening the portion of emitted light propagating in forward directions. FIG. 8 shows the light guide 27 and the light-screening plate 28 as attached to a camera. In this example, the emitted light is deflected upward. The camera as shown in FIG. 8 may be enclosed in a housing (as shown at 4 in FIG. 5) directly.

With an optical fiber 8 as shown in FIG. 5 connected to the upper surface of the housing 4, emitted light is led to and serves to activate the outer lamp. In such an application, the amplifier circuit 21 described above may be dispensed with.

By using a light intensity-reducing filter or a light guide as described above, the quantity of light emitted from the inner lamp and reflected from the target object to be photographed becomes negligibly small from the point of view of the camera. As a result, the aforementioned phenomena of marine snow and flare due to the inner lamp can be effectively prevented. The light passing through the aforementioned filter or light guide is received by the sensor 10 at the light receiving part of the outer lamp 9 either through the optical fiber cable 8, directly or by reflection from the target object to be photographed. The sensor 10 serves to convert the received light into an electrical signal and thereby controls the emission of light from the outer lamp 9.

In summary, the disclosure is intended to be interpreted broadly. It is to be noted in particular that throughout herein the term "infrared" is intended to include near infrared and that the precise definition of the term "near infrared" depends on how the camera is sensitive to light of a particular wavelength range and light in that wavelength range is desired to be eliminated from affecting the quality of the obtained image.

What is claimed is:

1. A method of controlling emission of light from an outer flash lamp having a light receiving part and externally attached to a camera having an inner lamp which is provided internally to said camera and includes a light emitting part, said method comprising the steps of:

preparing a filter which passes infrared light and prevents visible light from passing through;

providing said light emitting part of said inner lamp of said camera with said filter; and causing infrared light emitted through said filter to be received by said light receiving part of said outer flash lamp and thereby causing said light receiving part to control emission of light from said outer flash lamp.

2. The method of claim 1 wherein said filter is pasted over said light emitting part of said camera.

3. The method of claim 1 wherein said camera is enclosed in a watertight housing and said filter is pasted on said housing.

4. A device for controlling emission of light from an outer flash lamp having a light receiving part and externally attached to a camera having an inner lamp which is provided internally to said camera and includes a light emitting part, said device comprising:

a filter which passes infrared light and prevents visible light from passing through, said filter being provided to said light emitting part of said inner lamp; and a light receiving element in said light receiving part of said light receiving part, said light receiving element serving to control emission of light from said outer lamp in response to infrared light received through said filter.

5. The device of claim 4 wherein said filter is pasted over said light emitting part of said camera.

6. The device of claim 4 further comprising a watertight housing enclosing said camera, said filter being pasted on said housing.

7. A method of controlling emission of light from an outer flash lamp having a light receiving part and externally attached to a camera having an inner lamp which is provided internally to said camera and includes a light emitting part, said method comprising the steps of:

preparing a light-intensity reducing filter which reduces intensity of incident light thereon from said light emitting part and allows light with a lowered intensity to pass therethrough, said light receiving part being designed to activate said outer lamp in response to light with said lowered intensity;

providing said light emitting part of said inner lamp of said camera with said light intensity-reducing filter; and causing said light with said lowered intensity emitted from said inner lamp and passed through said light-filter to be received by said light receiving part of said outer flash lamp and thereby causing said light receiving part to control emission of light from said outer flash lamp.

8. The method of claim 7 wherein said light intensity-reducing filter is pasted over said light emitting part of said camera.

9. The method of claim 7 wherein said camera is enclosed in a watertight housing and said light intensity-reducing filter is pasted on said housing.

10. A device for controlling emission of light from an outer flash lamp having a light receiving part and externally attached to a camera having an inner lamp which is provided internally to said camera and includes a light emitting part, said device comprising:

a light-intensity reducing filter which reduces intensity of incident light thereon from said light emitting part and allows light with a lowered intensity to pass therethrough;

a circuit in said light receiving part for activating said outer lamp in response to light with said lowered intensity passed through said light intensity-reducing filter.

11. The device of claim 10 wherein said light intensity-reducing filter is pasted over said light emitting part of said camera.

12. The device of claim 10 further comprising a watertight housing enclosing said camera, said light intensity-reducing filter being pasted on said housing.

13. A method of controlling emission of light from an outer flash lamp having a light receiving part and externally attached to a camera having an inner lamp which is provided internally to said camera and includes a light emitting part, said method comprising the steps of:

providing a light guide with a reflecting surface to said light emitting part and internally deflecting and thereby leading light from said light emitting part therethrough to said light receiving part of said outer lamp; and providing a light screening means in front of said light emitting part for screening light propagating forward from said light emitting part.

14. The method of claim 13 wherein said light guide is pasted over said light emitting part of said camera.

15. The method of claim 13 wherein said camera is enclosed in a watertight housing and said light guide is pasted on said housing.

16. A device for controlling emission of light from an outer flash lamp having a light receiving part and externally attached to a camera having an inner lamp which is provided internally to said camera and includes a light emitting part, said device comprising:

a light guide with a reflecting surface for internally deflecting and thereby guiding light from said light emitting part to said light receiving part of said outer lamp; and a light screening means for screening off light propagating forward from said inner lamp.

17. The device of claim 16 wherein said light guide is pasted over said light emitting part of said camera.

18. The device of claim 16 further comprising a watertight housing enclosing said camera, said light guide being pasted on said housing.

19. The method of claim 7 wherein said light-intensity reducing filter has a hole serving to allow a portion of the incident light to pass through.

20. The device of claim 10 wherein said light-intensity reducing filter has a hole serving to allow a portion of the incident light to pass through.

* * * * *